Figure 11:
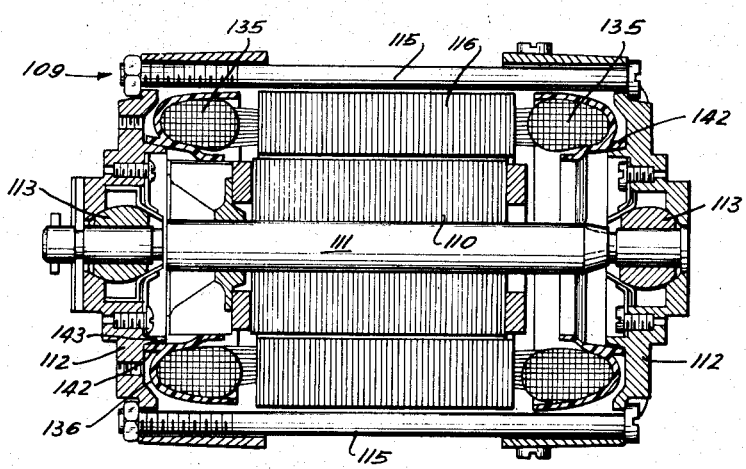

Sept. 26, 1961      E. O. LINDSTRÖM      3,002,119
INSULATED FIELD WINDING FOR DYNAMO-ELECTRIC
MACHINES AND METHOD OF MAKING SAME
Filed Dec. 9, 1957      3 Sheets-Sheet 1
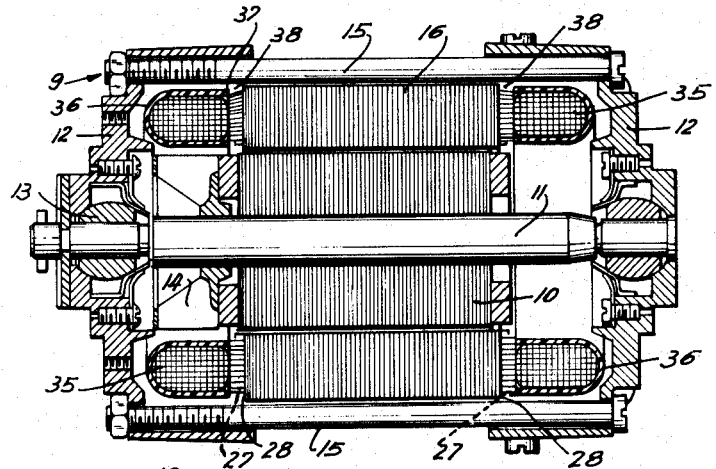
FIG. 1
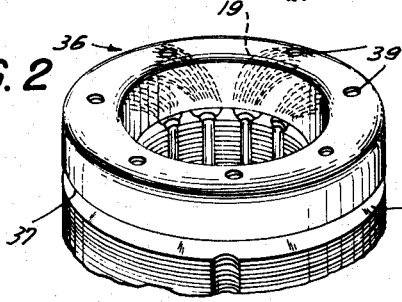
FIG. 2
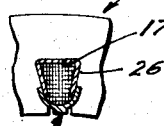
FIG. 7
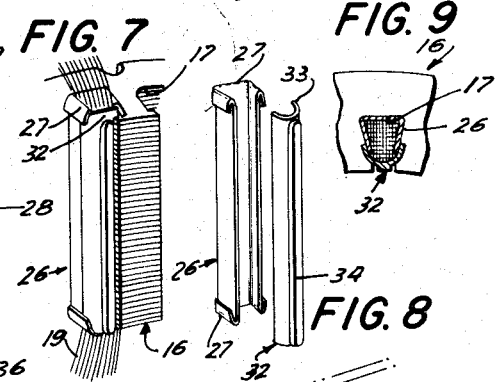
FIG. 9
FIG. 8
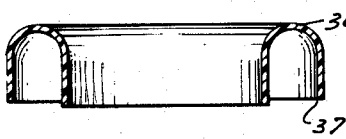
FIG. 3
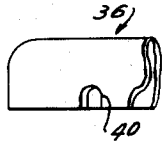
FIG. 4    FIG. 5
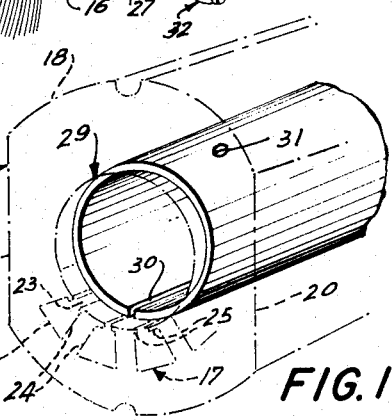
FIG. 10
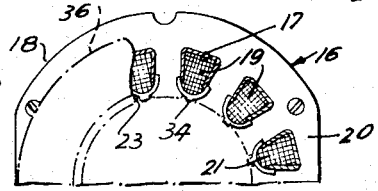
FIG. 6
INVENTOR
Ernst Olof Lindström
BY
his ATTORNEY Sept. 26, 1961 E. O. LINDSTROM 3,002,119
INSULATED FIELD WINDING FOR DYNAMO-ELECTRIC
MACHINES AND METHOD OF MAKING SAME
Filed Dec. 9, 1957 3 Sheets-Sheet 2

INVENTOR
Ernst Olof Lindstrom
BY
his ATTORNEY

Sept. 26, 1961    E. O. LINDSTROM    3,002,119
INSULATED FIELD WINDING FOR DYNAMO-ELECTRIC
MACHINES AND METHOD OF MAKING SAME
Filed Dec. 9, 1957    3 Sheets-Sheet 3

INVENTOR
Ernst Olof Lindstrom
BY
his ATTORNEY

United States Patent Office 3,002,119
Patented Sept. 26, 1961

3,002,119
INSULATED FIELD WINDING FOR DYNAMO-ELECTRIC MACHINES AND METHOD OF MAKING SAME
Ernst Olof Lindström, Stockholm-Vällingby, Sweden, assignor to Aktiebolaget Electrolux, Stockholm, Sweden, a corporation of Sweden
Filed Dec. 9, 1957, Ser. No. 701,429
Claims priority, application Sweden Dec. 13, 1956
10 Claims. (Cl. 310—260)

My invention relates to insulated field windings for dynamo-electric machines and to a method of making them.

In order to insulate and protect the ends of stationary field windings of fractional horsepower electric motors, it has generally been the practice heretofore to wind strips of cotton or like material about the ends of the windings after the individual coils thereof have been inserted in the slots of the stator core structure. This is objectionable because the strips of cotton, nylon or other material must be wrapped about the ends of the field windings by hand, which is tedious and time-consuming.

It is an object of my invention to provide an improved arrangement for insulating the ends of stationary field windings of dynamo-electric machines, which is efficient, of simplified construction and can be readily assembled. I accomplish this by providing end insulating members of annular form which may be moved lengthwise of and toward the stator core structure, whereby the end insulating members can be readily positioned over the ends of the field windings and effectively insulate and protect the windings. Further, the end insulating members of annular form may be U-shaped in section and provide covers for the ends of the windings which are maintained in good frictional engagement therewith or connected mechanically to the ends of the field windings in any other suitable manner.

Another object of the invention is to provide in the slots of the stator core structure in which the coils of the windings are disposed insulating members which extend beyond the ends of the core structure and serve as stops to limit the extent of movement of the end insulating members toward the core structure when being positioned over the ends of the field windings.

A further object of the invention is to provide an improved method of making a stator core structure in which the ends of the windings thereof are effectively insulated and protected by end insulating members which are moved lengthwise of the core structure into position over the ends of the windings.

Further objects and advantages of my invention will become apparent as the following description proceeds, and the features of novelty which characterize my invention will be pointed out with particularity in the claims annexed to and forming a part of this specification.

Figure 12:
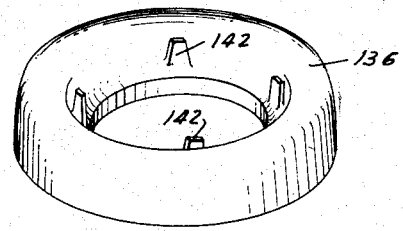
Figure 13:
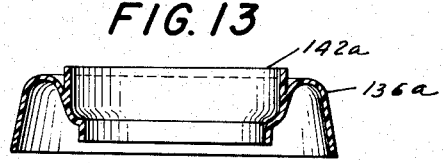
Figure 14:
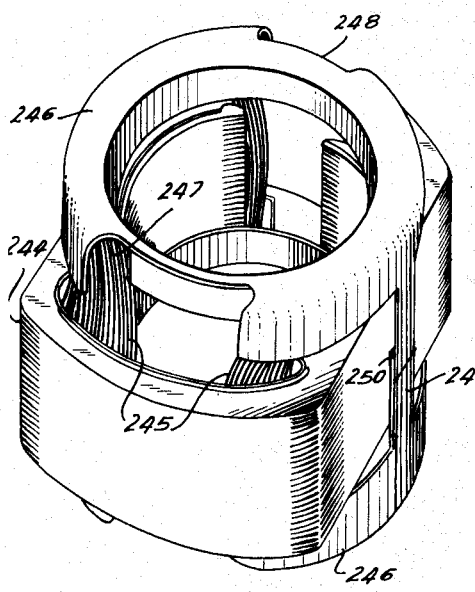
Figure 15:
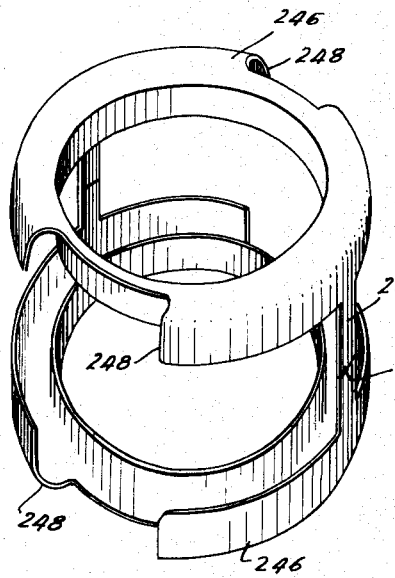

In the drawings, FIG. 1 is a vertical sectional view of a single phase asynchronous motor embodying my invention; FIG. 2 is a perspective view of an end of the stator of the motor shown in FIG. 1; FIG. 3 is a sectional view of a detail shown in FIGS. 1 and 2; FIGS. 4 and 5 are fragmentary elevation views illustrating other forms of the detail shown in FIG. 3; FIG. 6 is an end view, partly in section, of the stator shown in FIGS. 1 and 2; FIG. 7 is a fragmentary perspective view of the stator shown in FIGS. 1 and 2 to illustrate more clearly the insulation of the windings in a slot thereof; FIG. 8 is a perspective view of the insulation details shown in FIG. 7; FIG. 9 is a fragmentary cross-sectional view of the stator shown in FIGS. 1 and 2 to illustrate the insulation details therein; FIG. 10 is a view diagrammatically illustrating one manner in which the windings and insulation details are placed in the slots of the stator;

FIG. 11 is a vertical sectional view of a motor, like the motor shown in FIG. 1, illustrating another embodiment of the invention; FIG. 12 is a perspective view of a detail of the motor shown in FIG. 11; FIG. 13 is a sectional view of another form of the detail shown in FIG. 12; FIG. 14 is a perspective view of a stator of a motor, like that shown in FIGS. 1 and 11, illustrating another embodiment of the invention; FIG. 15 is a perspective view of details shown in the stator illustrated in FIG. 14; and each of FIGS. 16 to 20 includes a fragmentary perspective view *a* and fragmentary side view *b*, partly in section, illustrating different ways details like those shown in FIG. 15 may be fixed to the stator; and FIG. 21 is a fragmentary side view, partly in section, illustrating a still further way details like those shown in FIG. 15 may be fixed to the stator.

Referring to FIG. 1, I have shown my invention embodied in a single-phase asynchronous motor 9 having a short-circuit rotor 10 fixed to a shaft 11 having the opposite ends thereof journaled in bearings 13 fixed in bearing brackets which form end frames 12 of the stator frame of the motor. A fan 14 is fixed to the shaft 11 between one end of the rotor 10 and the bearing bracket 12 adjacent thereto for circulating cooling air through the motor 9.

The stator of the motor includes a laminated magnetic field structure of annular form 16 which is held between the end frames 12 by elongated threaded bolts 15 having tightening nuts. The magnetic field structure 16 comprises a yoke and inwardly extending pole pieces which terminate in concave-shaped pole faces defining a bore adapted to receive the rotor 10. The pole pieces are formed with leading and lagging tips which are spaced from the yoke to provide wall surfaces defining spaces or slots 17 of keystone shape. The slots 17 have openings 23 at the inner periphery thereof and are divided into two groups to receive coils of a main winding 19 and an auxiliary winding 21. In the embodiment being described, eight slots 17 are provided at diametrically opposite regions of the cylindrical-shaped portions of the core structure 16 which receive the coils of the main winding 19, and four slots are provided at diametrically opposite regions of the flattened side portions of the core structure which receive the coils of the auxiliary winding 21. A capacitor (not shown) is connected in the auxiliary winding 21 to facilitate starting the motor 9, whereby the current in the auxiliary winding will be 90 electrical degrees or one-half pole step out of phase with the current in the main winding 19. If desired, a centrifugally operated switch may be provided in the auxiliary winding circuit 21 to open the latter when the motor 9 reaches 60 to 80% of its rated speed. In place of a capacitor, resistive and inductive resistances may be employed in the auxiliary winding circuit 21 to obtain the phase shift of current therein.

As best shown in FIG. 10, the slots 17 are of keystone shape having flat bottoms 22 and inclined sides 24 which converge toward one another toward the openings 23, the slots further including flat inner wall portions 25 extending from the sides 24 to the openings 23. The flat inner wall parts 25 at the vicinities of the openings 23 effectively serve to retain the coils of the windings 19 and 21 in the slots 17.

The windings 19 and 21 may be formed of thin copper wire which is enameled or varnish-insulated and wound into a number of coils each having a given number of turns, the individual turns of each coil being held together at one region thereof by suitable adhesive tape, for example. In both the main winding 19 and auxiliary winding 21, the coils forming each winding desirably are wound from a single length of wire.

The insulation for each slot 17 of the core structure 16 comprises a three-sided member 26 which bears against the bottom 22 and sides 24 of the slot and forms a lining therein. The members 26 are longer than the core structure 16 and the end portions projecting beyond the end walls 28 of the core structure are bent back at 27, the extreme ends of the bent back portions engaging the core end walls 28 to prevent longitudinal movement or displacement of the members 26 in the slots 17, as best shown in FIGS. 1 and 7. The members 26 may be formed of stiff paper or fibrous material having a plastic coating at the inner surface, such as press board available under the trade name "Mylar."

After the insulation members 26 are positioned in the slots 17 of the core structure 16, the latter may be positioned for rotation on a horizontally disposed sleeve 29 having a slit 30 extending lengthwise thereof. The sleeve 29, which is stationary and non-rotatable, may be supported at one end in any suitable manner, as by structural members, for example, having provisions for supporting and hanging the individual coils of the windings 19 and 21 when the latter are being inserted in the slots 17. The sleeve 29 desirably is as long or slightly longer than the core structure 16 and positioned so that the slit 30 is at the bottom of the sleeve. A locating or positioning member 31 is provided on the sleeve at a region thereof diametrically opposite the slit 30. The locating member 31 may be in the form of a ball which is resiliently held in the sleeve 29 and adapted to snap into position in an opening 23 of a slot 17 which is diametrically opposite the opening of the slot 17 at the immediate vicinity of the slit 30.

In view of the foregoing, it will now be understood that each coil of the main and auxiliary windings 19 and 21 is positioned within the sleeve 29 and opposing sides thereof are inserted into the appropriate slots 17 through the slit 30 which is somewhat narrower than the slot openings 23. The appropriate slots 17 in which the sides of each coil are inserted can be conveniently positioned opposite the slit 30 by rotating the core structure 16 on the sleeve 29, the resiliently biased positioning member 31 readily moving past the openings 23 in the slots 17 and holding the core structure 16 in position when the latter is in the desired position by snapping into the opening 23 on a slot 17 which is diametrically opposite a slot into which a side of a coil is adapted to be inserted. The particular slots in which the sides of the individual coils are inserted is determined by the wiring scheme applicable to the main and auxiliary windings 19 and 21 provided for the core structure 16. In this way, the sides of each coil of the two windings eventually can be positioned in the correct slots 17 of the core structure.

After each side of a coil is inserted in a slot 17, a second insulating member 32 of U-shape is inserted into the slot at one end of the core structure 16. The U-shaped insulating members 32 are resilient in character with the opposing sides 33 thereof separated a greater distance than the sides 24 of the slots at the narrow inner ends thereof. Hence, when the U-shaped insulating members 32 are moved along the sides 24 of the slots, the opposing sides 33 of the members 32 are pressed toward one another and resiliently clamped in position against the sides of the slots 17. When the U-shaped members 32 are positioned in the slots 17, the outer extremities of the opposing sides 33 thereof overlap the sides of the insulating members 26, and the ridges 34 between the opposing sides 33 are located in the slot openings 23, as best seen in FIG. 6. When the insulating members 32 are being inserted in the slots 17, the ridges 34 move in the slot openings 23 and serve to guide the insulating members while being moved lengthwise of the core structure 16. The insulating member 32 desirably may be formed of any suitable plastic material like nylon or Grilon, for example.

The motor 9 is provided with suitable connections (not shown) for connecting it to a source of electrical supply, such connections being connected to the ends of the main and auxiliary windings 19 and 21 and covered with suitable insulating tubing. After the windings 19 and 21 are provided on the core structure 16, the opposing ends 35 of the windings project beyond the ends of the core structure and form so-called winding heads. The adhesive tape provided to hold together the turns of wire of each coil, prior to inserting the coils in the slots, may be located at one end 35 of the windings. In a similar manner, the turns of wire of each coil located at the opposite end 35 of the windings may be held together at one region by suitable adhesive tape.

The winding ends 35 at the end of the core structure 16 are covered by insulating members 36 which are of annular form and essentially U-shaped in section, as shown in FIGS. 1 and 3. The members 36 are flexible and resilient in character and are so constructed and formed that, when moved lengthwise of the core structure 16 over the winding ends 35, the insulating members 36 may be resiliently fastened to the winding ends due to the resiliency of the insulating members. Accordingly, after the insulating members 36 are positioned over the winding ends 35 and cover three sides thereof, the insulating members serve to protect the winding ends during further handling of the core structure in fabricating the motor 9.

The projecting ends 27 of the insulating members 26, which extend beyond the ends of the core structure 16, engage and contact the regions of the winding ends 35 immediately adjacent thereto. In this way, the projecting ends 27 of the insulating members act to position the winding ends 35 and prevent longitudinal movement thereof toward the ends 28 of the core structure when the insulating members 36 are being moved into place over the winding ends 35.

In FIG. 1 it will be observed that the distance from the ends 28 of the core structure 16 to the regions of the winding ends 35 farthest removed therefrom is greater than the length of the insulating members 36 from the closed to the open ends thereof. Accordingly, when the insulating members 36 are positioned over the winding ends 35 and in frictional engagement therewith, the edges 37 of the insulating members 36, at the open ends thereof, are spaced from the ends 28 of the core structure 16 to provide gaps 38 therebetween.

By providing the gaps 38 between the insulating members 36 and ends 28 of the core structure 16, it is possible to machine the ends 28 of the core structure after the insulating members 36 have been applied to the winding ends 35. Further, the gaps 38 provide paths of flow for cooling air circulated through the motor 9 by the fan 14. The gaps 38 also provide passages through which an impregnating agent can be supplied to the motor windings, as will be explained hereinafter.

The insulating members 36 desirably are formed of plastic material which is transparent, whereby the position of the wires in the winding ends 35 can be inspected without difficulty when the insulating members are being placed in position and after they are in frictional engagement with the winding ends 35. Although I do not wish to be limited thereto, the insulating members 36 may be formed of nylon, Grilon or any other suitable thermosetting plastic. In the alternative, the insulating members 36 may be formed of metal having all surfaces thereof covered with a layer of suitable plastic material possessing the desired electrical insulating properties. By employing insulating members 36 of the kind just described, end covers are provided for the winding ends 35 which not only possess good electrical insulating properties but also have high thermal resistance.

By employing end insulating members 36 which are of annular form and of the type just described and illustrated in the drawing, I have discovered that the need for providing an insulating varnish for the motor windings can be eliminated, which, of course, will also omit the step of heat treating the core structure 16 to an elevated temperature which is necessary when such insulating varnish is applied to the motor windings. By eliminating the step of applying insulating varnish to the enamel wire and the subsequent heating step required in such case, the stator of the motor can be fabricated at less cost and an improved end product is obtained.

In certain instances it may be desirable to connect the insulating members 36 to the winding ends 35 with a suitable plastic impregnating material. After such impregnating material is introduced between the winding ends 35 and the insulating members 36, and the latter are held tightly against the winding ends, the stator may be heated to an elevated temperature to bond the winding ends 35 and insulating members 36 together. Insulating members 36 formed of suitable plastic material and of the type described above are highly resistant to constituents usually present in the insulation provided for the motor windings, whereby the insulating members 36 will not be subject to attack by the winding insulation and the parts will only be connected or bonded together when subjected to heating at an elevated temperature. Further, the plastic impregnating agent may also be employed to impregnate the coils in the slots 17.

The plastic impregnating agent may be supplied to the winding ends 35 and the coils in the slots 17 by dipping the winding ends, with the insulating members 36 positioned thereon, in a body of the agent in a fluid state. In such case, the insulating members 36 may be provided with a number of openings 39, as shown in FIG. 2, so that the impregnating material will be drawn upwardly by capillary forces in the winding ends 35 and in the slots 17 of the core structure 16. Upon subsequent heating to an elevated temperature, the coils in the slots 17 are bonded to the slot insulating members 26 and 32 at the same time the end insulating members 36 are bonded to the winding ends 35. It is especially desirable to form the insulating strips 32 and end insulating members 36 of the same material, such as nylon, for example, when these parts are united and bonded to one another by a suitable plastic impregnating agent, because the insulating characteristics for all parts of the windings 19 and 21 will be essentially the same.

As shown in FIG. 4, openings 40 may be provided in the end insulating members 36 to provide passages through which the motor connections may extend. As shown in FIG. 5, the outer wall of the insulating members 36 may be provided with parts 41 adapted to engage the ends of the core structure 16 and position the latter thereon. When insulating members 36 of the form shown in FIG. 5 are positioned at the ends of the core structure 16, gaps 38 are still formed between the ends of the core structure and the insulating members 36 to provide passages for circulating cooling air through the motor 9 by the fan 14.

In FIGS. 11 and 12 I have illustrated another embodiment of the invention in which parts similar to those shown in FIG. 1 are designated by the same reference numerals with "100" added thereto. The embodiment of FIG. 11 differs from the first described embodiment of FIG. 1 in that the end insulating members 136 for the winding ends 135 are provided with spaced apart lugs or tabs 142 at the inner side or wall thereof adapted to be positioned about a flange 143 extending inwardly from the end frames 112 of the motor 109, as shown in FIG. 11. In this way, the insulating members or caps 136 for the winding ends 135 are clamped between the opposite end frames 112 and firmly held against the core structure 116.

In FIG. 13 I have shown another form of end insulating member or cap 136a which differs from the insulating member in FIGS. 11 and 12 in that the insulating member is provided with a collar 142a of annular form which is adapted to be positioned about the inwardly extending flange 143 on the end frame 112 of the motor illustrated in FIG. 11. If desired, the flange 143 may be provided with a groove (not shown) adapted to receive the collar 142a.

In FIGS. 14 and 15 I have shown a further embodiment of the invention in which a stator core 244 of a motor is provided with a pair of windings 245 having U-shaped insulating members or covers 246 for the ends 247 of the windings. The outer walls or sides of the U-shaped insulating members are cut away at 248 at the regions between the windings 245. In FIGS. 14 and 15 the end insulating members or covers 246 are provided with tabs 249 at diametrically opposite regions thereof, such tabs 249 extending toward one another with the extreme outer ends in overlapping relation at 250 and adapted to be secured together in any suitable manner.

Different ways in which the tabs 249 may be secured together are shown in FIGS. 16 to 20, inclusive, whereby the end insulating members 246 may simply be connected mechanically to the ends 247 of the windings 245 and firmly secured in position without any need of a plastic bonding agent, as described above. Hence, the embodiment of FIGS. 14 and 15, together with the different arrangements for connecting the tabs 249, which are illustrated in FIGS. 16 to 20, may be employed even when the end insulating members are held in frictional engagement with the ends of the motor windings, whereby a construction will be provided that will insure a reliable mechanical connection of the end insulating members to the ends of the windings. This construction not only reduces the cost of manufacture of the motor but also reduces the operating temperature of the motor by at least 12° C., thereby substantially increasing the power of the motor.

Figure 16:
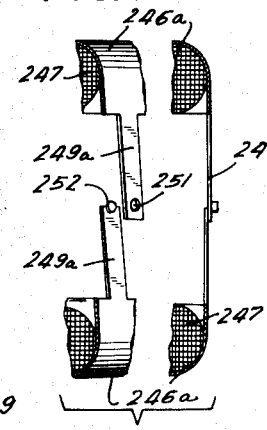

In FIG. 16 the tabs 249a forming an integral part of one end insulating member 246a are apertured at 251 to receive pins 252 fixed to the tabs 249a forming an integral part of the opposite end insulating member 246a. The pins 252 are frictionally held in the apertures 251 to form a locking device connecting the end insulating members to one another.

Figure 17:
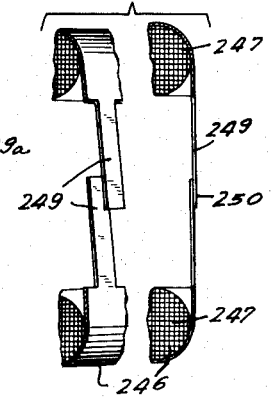

The tabs 249 in FIG. 17 overlap one another at 250 in a manner similar to that shown in FIGS. 14 and 15 and may be secured together, as by a suitable adhesive or bonding agent, for example.

Figure 18:
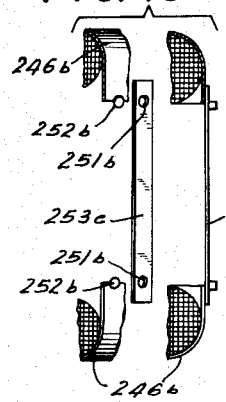

In FIG. 18 each of the end insulating members 246b is provided with pins 252b which are diametrically opposite one another and adapted to receive the apertured ends of connecting tabs or straps 253. The pins 252b are frictionally held in the apertures 251b of the connecting tabs 253 to connect the end insulating members 246b to one another.

Figure 19:
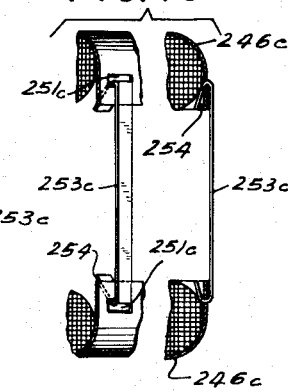

The embodiment of FIG. 19 is generally like that of FIG. 18 and differs therefrom in that the end insulating members 246c are provided with slots 251c instead of pins. The slots 251c receive the end portions of the connecting tabs or straps 253c, the end portions 254 being bent back in the manner illustrated in FIG. 19 to connect the end insulating members 246c together.

Figure 20:
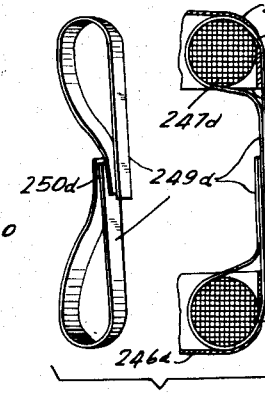
Figure 21:
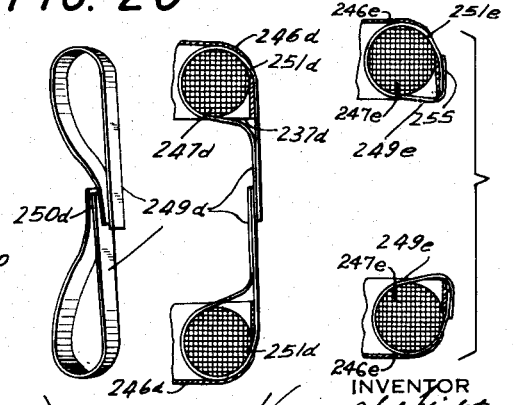

The end insulating members 246d in FIG. 20 are slotted at 251d to provide openings through which straps 251d pass. Each strap 249d is disposed about the end 247d of a stator winding and the opposite ends thereof extend toward the opposite ends of another strap 249d connected in a similar manner to the opposite end insulating member 246d. In this embodiment a part of each strap 249d overlies a region of the outer wall of the end insulating member 246d with which it is associated along a zone extending between the slot 251d and the edge 237d of the outer wall. Further, each strap 249d is tightly held about the projecting end 247d of the winding and in intimate physical contact therewith. The four ends of the straps 249d, located at corresponding regions of the spaced apart end insulating members 246d, are secured together at 250d in any suitable manner to connect the end insulating members to one another.

In the embodiment of FIG. 21 the end insulating members 246e are provided with slots 251e through which straps 249e pass. Each of the straps 249e encircles the end 247e of a stator winding and the opposite ends of each strap are secured at 255 in any suitable manner. In FIG. 21 the straps 249e fasten the end insulating members 246e directly to the ends 247e of the stator coil, whereby the end insulating members 246e, stator field winding and stator core form a unitary structure in the same way as in the embodiment illustrated in FIG. 20. While the straps 249d in FIG. 20 directly connect the end insulating members to one another, the straps 249e in FIG. 21 connect the end insulating members 246e together equally effectively through the stator core by connecting each end insulating member to the end 247e of the stator field winding with which the end insulating member is associated.

While I have shown and described several embodiments of my invention, it will be apparent that modifications and changes may be made without departing from the spirit and scope of the invention, as pointed out in the following claims.

What is claimed is:

1. In a dynamo-electric machine, a magnetic field structure of annular form having a yoke and inwardly extending pole pieces which terminate in concave-shaped pole faces defining a bore adapted to receive a rotor, each of the pole pieces having leading and lagging pole tips which are spaced from the yoke to provide wall surfaces defining spaces, the pole pieces having field coils including first portions in the spaces and second portions which project beyond the end faces of the magnetic field structure, and an open-ended insulating member of annular form which in section includes a closed end and spaced arms extending toward its open end, said member being disposed about and in intimate physical contact with the second portions of the field coils at one end of the magnetic field structure, the closed end of said insulating member of annular form being positioned about the outermost projecting parts of the second portions of the field coils and the spaced arms thereof extending toward the end face at said one end of the magnetic field structure.

2. Apparatus as set forth in claim 1 in which the spaced arms of said insulating member of annular form extend toward the end face at said one end of the magnetic field structure and terminate at regions removed from the end face to provide a gap between the end face and said insulating member.

3. Apparatus as set forth in claim 1 in which said insulating member of annular form is resilient in character and frictionally engages the second portions of the field coil at said one end of the magnetic field structure.

4. Apparatus as set forth in claim 1 which includes means uniting the inner surface of said insulating member and the second portions of the field coil at said one end of the magnetic field structure.

5. Apparatus as set forth in claim 1 in which said insulating member of annular form includes a plurality of spaced elements which engage the end face at said one end of the magnetic field structure to position said insulating member about said second portions of the field coil.

6. Apparatus as set forth in claim 1 in which said insulating member of annular form is apertured at its closed end.

7. Apparatus as set forth in claim 1 which includes an open-ended insulating element of annular form which in section includes a closed end and spaced arms extending toward its open end, said element being disposed about and in intimate physical contact with the second portions of the field coils at the end of the magnetic field structure opposite to said one end thereof, the closed end of said insulating element of annular form being positioned about the outermost projecting parts of the second portions of the field coils at said opposite end of the magnetic field structure and the spaced arms thereof extending toward the end face at the opposite end of the magnetic field structure, and fastening means for holding said insulating member and insulating element in position on the second portion of the field coils.

8. Apparatus as set forth in claim 7 in which said fastening means includes parts for connecting said insulating member and insulating element to one another.

9. Apparatus as set forth in claim 1 which includes an end cover, means for fixing said end cover in position over said insulating member at the one end of the magnetic field structure, said insulating member and the inner surface of a region of said end cover having cooperating parts to locate and position said insulating member.

10. Apparatus as set forth in claim 1 which includes elongated insulating strips in the spaces which overlie the first portions of the field coils, said strips having their ends projecting beyond the end faces of the magnetic field structure, and means for uniting the ends of said strips at the one end of the magnetic field structure and the inner arm of said insulating member which defines the opening therein.

References Cited in the file of this patent

UNITED STATES PATENTS

| | | |
|---|---|---|
| 1,064,295 | Dawson | June 10, 1913 |
| 2,372,453 | Sherman et al. | Mar. 27, 1945 |
| 2,573,976 | Linders | Nov. 6, 1951 |
| 2,578,495 | Wirth | Dec. 11, 1951 |
| 2,632,602 | Weis | Mar. 24, 1953 |
| 2,636,137 | Andrus | Apr. 21, 1953 |
| 2,677,067 | Johnson et al. | Apr. 27, 1954 |
| 2,683,233 | Ruhl | July 6, 1954 |
| 2,772,046 | Shomphe | Nov. 27, 1956 |
| 2,795,712 | Suhr | June 11, 1957 |
| 2,812,459 | Smith | Nov. 5, 1957 |

UNITED STATES PATENT OFFICE
CERTIFICATE OF CORRECTION

Patent No. 3,002,119 September 26, 1961

Ernst Olof Lindström

It is hereby certified that error appears in the above numbered patent requiring correction and that the said Letters Patent should read as corrected below.

In the grant, line 1, name of inventor, for "Ernest Olof Lindström" read -- Ernst Olof Lindström --; column 8, line 26, for "portion" read -- portions --.

Signed and sealed this 20th day of February 1962.

(SEAL)
Attest:

ERNEST W. SWIDER
Attesting Officer

DAVID L. LADD
Commissioner of Patent